(12) United States Patent
Xie

(10) Patent No.: US 9,343,240 B2
(45) Date of Patent: May 17, 2016

(54) POLARIZABLE ION-CONDUCTING MATERIAL

(75) Inventor: Xian Ning Xie, Singapore (SG)

(73) Assignee: National University of Singapore, Singapore (SG)

( * ) Notice: Subject to any disclaimer, the term of this patent is extended or adjusted under 35 U.S.C. 154(b) by 158 days.

(21) Appl. No.: 14/131,625

(22) PCT Filed: Jul. 30, 2012

(86) PCT No.: PCT/SG2012/000275
§ 371 (c)(1),
(2), (4) Date: Jan. 8, 2014

(87) PCT Pub. No.: WO2013/015747
PCT Pub. Date: Jan. 31, 2013

(65) Prior Publication Data
US 2014/0147772 A1  May 29, 2014

Related U.S. Application Data

(60) Provisional application No. 61/512,516, filed on Jul. 28, 2011.

(51) Int. Cl.
| | | |
|---|---|---|
| *H01M 8/10* | (2016.01) |
| *H01M 6/18* | (2006.01) |
| *H01M 4/88* | (2006.01) |
| *H01G 9/00* | (2006.01) |
| *H01G 11/04* | (2013.01) |
| *C08J 5/22* | (2006.01) |
| *H01G 11/56* | (2013.01) |
| *H01M 10/0565* | (2010.01) |

(52) U.S. Cl.
CPC . *H01G 11/04* (2013.01); *C08J 5/22* (2013.01); *C08J 5/2231* (2013.01); *H01G 11/56* (2013.01); *H01M 8/1018* (2013.01); *H01M 8/1067* (2013.01); *H01M 10/0565* (2013.01); *C08J 2333/26* (2013.01); *C08J 2339/02* (2013.01); *H01M 2300/0082* (2013.01); *Y02E 60/13* (2013.01); *Y02E 60/521* (2013.01)

(58) Field of Classification Search
CPC ........ C08J 5/22; C08J 5/2231; C08J 2333/26; C08J 2339/02; H01G 11/56; H01G 11/04; H01M 8/1067; H01M 10/0565; H01M 8/1018; H01M 2300/0082; Y02E 60/521; Y02E 60/13
USPC .................. 429/492, 306; 252/182.1; 361/502
See application file for complete search history.

(56) References Cited

U.S. PATENT DOCUMENTS

2006/0062982 A1* 3/2006 Hammond Cunningham et al. ...................... B01D 69/02
428/220

* cited by examiner

*Primary Examiner* — William Cheung
(74) *Attorney, Agent, or Firm* — Cesari and McKenna LLP

(57) ABSTRACT

A polarizable ion-conducting material. The material contains mobile ions and a matrix formed of a polymer having ionic groups of a charge opposite to that of the mobile ions, wherein the material has a polarization of at least 0.2 mC/g, a capacitance of at least 0.1 mF/g, and a polarization retention time of at least 5 seconds. Also disclosed is a device containing such a polarizable ion-conducting material.

28 Claims, No Drawings

POLARIZABLE ION-CONDUCTING MATERIAL

CROSS-REFERENCE TO RELATED APPLICATIONS

This application is the National Stage of International Application No. PCT/SG2012/000275 filed on Jul. 30, 2012, which claims the benefit of U.S. Provisional Application No. 61/512,516 filed on Jul. 28, 2011. The contents of both applications are hereby incorporated by reference in their entirety.

BACKGROUND

Polarizable devices have wide applications, e.g., energy storage, data storage, and electric switching. Among the commonly used polarizable devices are dielectric capacitors and double-layer capacitors.

Dielectric capacitors have low capacitances, e.g., 0.1-1 $\mu F/cm^2$. Thus, their applications are very limited. On the other hand, double-layer capacitors, which store charges in their two electrode layers, have much greater capacitances, e.g., 0.5-5.0 $F/cm^2$. However, double-layer capacitors are expensive and cannot be easily scaled up.

There is a need to develop a scalable and inexpensive polarizable ion-conducting material.

SUMMARY

Disclosed herein is a polarizable ion-conducting material that is both inexpensive and scalable.

The polarizable ion-conducting material contains mobile ions and a matrix formed of a polymer having ionic groups of a charge opposite to that of the mobile ions. The material has a polarization of at least 0.2 mC/g (preferably, 2 mC/g to 25 C/g, and more preferably, 0.1 C/g to 25 C/g), a capacitance of at least 0.1 mF/g (preferably, 1 mF/g to 80 F/g, and more preferably, 0.5 C/g to 80 F/g), and a polarization retention time of at least 5 seconds (preferably, at least 10 seconds, and more preferably, at least 60 seconds).

Furthermore, the material can have an energy density of 1 W·h/kg to 30 W·h/kg (preferably, 5 W·h/kg to 30 W·h/kg) and a power density of 100 W/kg to 5000 W/kg (preferably, 500 W/kg to 5000 W/kg).

In one embodiment, the mobile ions are cations (e.g., $H^+$, $Li^+$, $Na^+$, $K^+$, $NH_4^+$, $Ca^{2+}$, $Mg^{2+}$, $Fe^{2+}$, $Fe^{3+}$, $Sn^{2+}$, $Co^{2+}$, $Cu^{2+}$, $Ag^+$, $Au^{2+}$, and a combination thereof) and the ionic groups are negatively charged (e.g., sulfonic groups, carboxylic groups, phosphonic groups, enolate groups, thiolate groups, phenoxide groups, and a combination thereof).

In another embodiment, the mobile ions are anions (e.g., $OH^-$ ions, $F^-$ ions, $Cl^-$ ions, $Br^-$ ions, $I^-$ ions, and a combination thereof) and the ionic groups are positively charged (e.g., ammonium groups).

The polarizable ion-conducting material can be of any shape and any size, e.g., a solid cylinder, a solid tube, a gel, a paste, a pallet, a powder, a particle, and a membrane. When it is a membrane (i.e., having a thickness of 1 nm to 1 cm; preferably, 1 μm to 10 mm; and more preferably, 0.05 mm to 5 mm), it can have a polarization of at least 0.2 mC/g, a capacitance of at least 0.1 mF/g, a polarization retention time of at least 5 seconds, an energy density of 1 W·h/kg to 30 W·h/kg, a power density of 100 W/kg to 5000 W/kg, and an ion conductivity of 0.0001 S/cm to 100 S/cm (e.g., 0.001 S/cm to 100 S/cm).

Still within the scope of this invention is a device for storing electric charge. The device contains the polarizable ion-conducting material described above, a first conducting layer, and a second conducting layer. The polarizable ion-conducting material is disposed between the first conducting layer and the second conducting layer. Upon charging, the mobile ions migrate toward the first conducting layer thereby polarizing the polarizable ion-conducting material; and, upon discharging, the mobile ions migrate toward the second conducting layer thereby depolarizing the polarizable ion-conducting material. The first conducting layer and the second conducting layer can be, independently, made of a graphite sheet, a carbon-based conductive material, copper, iron, steel, aluminum, silver, gold, platinum, or a combination thereof.

The details of one or more embodiments of the invention are set forth in the description below. Other features, objects, and advantages of the invention will be apparent from the description and the claims.

DETAILED DESCRIPTION

The polarizable ion-conducting material of this invention has various applications, including energy storage, data storage, ion conducting, and electric switching. In particular, the polarizable ion-conducting material can be used in energy-storage capacitors and lithium ion batteries, and can also be used as a fuel cell ion-conducting membrane, a solid-state electrolyte, and a microwave absorbing material.

The polarizable ion-conducting material contains mobile ions, either cations or anions, and a matrix formed of a polymer having ionic groups of a charge opposite to that of the mobile ions. In one embodiment, the polarizable ion-conducting material contains mobile cationic ions, e.g., $H^+$, $Li^+$, $Na^+$, and a combination thereof, and a matrix formed of a polymer having anionic groups, e.g., a polymer having sulfonic groups (e.g., poly(4-styrenesulfonate)), a polymer having carboxylic groups, a polymer having phosphonic groups, a polymer having enolate groups, a polymer having thiolate groups, a polymer having phenoxide groups, and a combination thereof. In another embodiment, the material of this invention contains anionic mobile ions, e.g., $F^-$, $Cl^-$, $OH^-$, and a combination thereof, and a matrix, formed of a polymer having cationic groups, e.g., poly(allylamine hydrochloride), poly(diallyldimethylammonium chloride), poly(acrylamide-co-diallyldimethylammonium chloride), and a combination thereof. In still another embodiment, the material contains a mixture of mobile cationic ions and mobile anionic ions and a matrix formed of one or more polymers, separately and jointly, having both anionic groups and cationic groups.

Without being bound by any theory, discussed below is a proposed mechanism of how the polarizable ion-conducting material stores energy. The mobile ions of this material adhere to the ionic groups by electrostatic attraction. These ions migrate within the material and condensed in an area upon charging by applying an external field, e.g., an electrical, electromagnetic, or magnetic field, across the material. On the other hand, the ionic groups of the polymer, forming charged lattice of a high density, do not migrate as they are immobile. As a result, the mobile ions move from and the ionic groups stay in the lattice, thus generating a polarization voltage. The polarized mobile ions migrate back to their average equilibrium positions upon discharging, e.g., by connecting the material to an external load. See, e.g., Xie et al., Energy & Environmental Science, 4, 3960-65 (2011); and Xie et al., Advanced Materials, 24, 76-81 (2012).

The polarizable ion-conducting material can have a polarization of at least 0.2 mC/g (e.g., 0.05 C/g to 25 C/g, 0.2 C/g to 25 C/g, and 1 C/g to 20 C/g), a capacitance of at least 0.1 mF/g (e.g., 0.05 F/g to 80 F/g, 0.2 F/g to 80 F/g, and 1 F/g to 50 F/g), a polarization retention time of at least 1 second (e.g., at least 10 seconds, at least 1 minute, at least 10 minutes, at least 1 hour, at least 2 hours, at least 24 hours, 1 second to 12 months, 5 seconds to 24 hours, 10 seconds to 24 hours, 10 seconds to 12 months, 60 seconds to 24 hours, 1 hour to 24 hours; and 1 hour to 24 months), an energy density of 1 W·h/kg to 500 W·h/kg (e.g., 2 W·h/kg to 300 W·h/kg, 5 W·h/kg to 100 W·h/kg, and 5 W·h/kg to 50 W·h/kg), and a power density of 10 W/kg to 5000 W/kg (e.g., 100 W/kg to 4000 w/kg, 200 W/kg to 2000 w/kg). The above-described material can be charged to 50% of its capacitance within 0.1 second to 6 hours (e.g., 0.5 second to 1 hour, 1 second to 10 minutes, and 1 second to 30 seconds).

The polarization retention time is the length of time during which 50% of the polarized charges remain in a polarizable ion-conducting material in the absence of an electrical field, an electromagnetic field, a magnetic field, or an external load.

The polarizable ion-conducting material can be a membrane having a thickness of 1 nm to 1 cm (e.g., 1 nm to 1000 nm, 2 nm to 500 nm, 3 nm to 100 nm, 1 μm to 1 cm, 10 μm to 1 cm, and 50 μm to 5 mm). Furthermore, the membrane typically has a polarization of 1 mC/cm$^2$ to 10 C/cm$^2$ (e.g., 5 mC/cm$^2$ to 10 C/cm$^2$, 10 mC/cm$^2$ to 10 C/cm$^2$, 0.05 C/cm$^2$ to 5 C/cm$^2$, and 0.1 C/cm$^2$ to 2 C/cm$^2$), a capacitance of 0.01 F/cm$^2$ to 10 F/cm$^2$ (e.g., 0.05 F/cm$^2$ to 5 F/cm$^2$ and 0.1 F/cm$^2$ to 1 F/cm$^2$), an ion conductivity of $1\times10^{-6}$ to 1000 S/cm (e.g., $1\times10^{-4}$ to 100 S/cm, $1\times10^{-5}$ S/cm to 10 S/cm, $1\times10^{-4}$ S/cm to 1 S/cm, and $1\times10^{-4}$ S/cm to 0.1 S/cm). For a membrane having a size of 1 cm×1 cm×0.1 mm, its open-circuit voltage typically ranges from 0.5 V to 5 V.

Also within the scope of this invention is a device for storing electric charges.

The device, which contains the polarizable ion-conducting material, can be used as a single unit for energy storage and other applications. If necessary, multiple units can be connected either in series or in parallel.

The device disclosed herein possesses several advantages over a double-layer capacitor. First, it can be securely assembled by sandwiching the solid polarizable ion-conducting membrane between two charge collectors. By contrast, a double-layer capacitor requires a nanomaterial having a large surface area and a liquid electrolyte, thus is prone to leaking. Second, the device of this invention invariably has a high capacitance. By contrast, the capacitance of a double-layer capacitor depends on a number of factors, e.g., nanomaterials and electrolytes. Third, the open-circuit voltage of this device is high. By contrast, to achieve a similar open-circuit voltage, a double-layer capacitor must contain an expensive organic electrolyte. Fourth, the capacitance of this device can be readily scaled up by simply using a large membrane. By contrast, scaling up the capacitance of a double-layer capacitor requires systematic optimization of many components including collectors, electrode materials, binders, separators, and electrolytes. Furthermore, this device costs as little as 10% or lower that of a double-layer capacitor for a given capacitance.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

EXAMPLE 1

Fabrication of a poly(lithium 4-styrenesulfonate) membrane

A polarizable ion-conducting membrane was fabricated following the procedure described in Xie et al., Energy & Environmental Science, 4, 3960-65 (2011); and Xie et al., Advanced Materials, 24, 76-81 (2012).

A solution of poly(lithium 4-styrenesulfonate) in water (300 g/L) was cast onto a substrate to form a membrane having a thickness of 0.1 mm. After it was air dried, the membrane was peeled off from the substrate. The membrane, soft and foldable, was cut into small pieces.

Assembly and Testing of a Graphite/Membrane/Graphite Device

A device was assembled with a membrane of 1.0 cm×1.0 cm×0.1 mm by sandwiching the membrane between two pieces of graphite electrodes. The device was placed in a device holder consisting of a hollow cube (made of insulating plastic) and two aluminum plates. The device was mounted between the two aluminum plates by screws tightened to a pressure up to 700 kg/cm$^2$.

The device was charged (i.e., polarized) and discharged (i.e., depolarized) by sweeping the electrode voltage in the loop of $-10\rightarrow10\rightarrow-10$ V at a rate of 1.0 V/s. A typical IV (current-voltage) curve was plotted using the data collected in the charging-discharging test. It was found, based on the curve, that the polarization current was up to 250 mA/cm$^2$, $1\times10^5$ times that of a typical dielectric polarization. In addition, the remnant voltage and current were found to be 3.5 V and 20 mA/cm$^2$, respectively. These results indicate that the membrane was highly polarizable and that it stored and released charges/energy during the voltage sweeping.

The energy-storage performance of the device was further evaluated by fully charging it under a constant voltage of 6 V, and discharging it under a constant resistance of 1.2, 5.3, or 8.0 kΩ. A discharge current (A/cm$^2$) vs. discharge time (second) curve was plotted using the data collected in this experiment. Unexpectedly, the device exhibited a typical open-circuit voltage of 2.5 V to 2.8 V and continued to discharge until its voltage dropped to 0.35 V.

Based on these observations, the energy E, the charge Q, and the capacitance C were calculated using the following three equations:

$$E = R\int I(t)dt;$$

$$Q = \int I(t)dt; \text{ and}$$

$$C = \frac{1}{2}\frac{Q^2}{E}.$$

For the E, Q, and C values, see the table below.

The performance of the device was further evaluated by fully charging it under a constant voltage of 6 V, and discharging it under a constant current of 10, 5, or 1.0 mA. A discharge voltage (V) vs. discharge time (second) curve was plotted. Likewise, the E, Q and C values were estimated and shown in the table below.

| Method | E, J/cm$^2$ | Q, C/cm$^2$ | C, F/cm$^2$ |
|---|---|---|---|
| Constant resistance | 0.33 | 0.39 | 0.23 |
| Constant current | 0.36 | 0.37 | 0.19 |

Unexpectedly, the membrane exhibited a high energy storing capacity, a high charge storing capacity, and a high capacitance.

The ion conductivity of the membrane was determined to be $2.8\times10^{-4}$ S/cm by AC impedance measurements (AUTO- LAB workstation; frequency range, 100 kHz to 100 Hz; the AC amplitude, 0.01 V; potential, ±0.7 and ±0.4 V).

Device Scalability and Stability Tests

Device scalability tests were conducted by assembling devices with membranes of different sizes. Following the procedure described above, devices were assembled with membranes of 1.0, 3.0, 5.0, 7.0, and 9.0 cm². Unexpectedly, all membranes in the devices each showed a capacitance of 0.2 F/cm², indicating excellent linear scalability. In other words, high capacitance was achieved by simply using larger pieces of membranes.

Further, the devices were subjected to more than 1000 charging-discharging cycles. There was no obvious decrease of the capacitance, which indicates that the devices were stable in energy storage.

EXAMPLE 2

Fabrication of a poly(sodium 4-styrenesulfonate) membrane

Following the procedure described in Example 1, a poly (sodium 4-styrenesulfonate) membrane, having a thickness of 0.1 mm, was fabricated.

Assembly and Testing of a Graphite/Membrane/Graphite Device

Following the procedures described in Example 1, a device was assembled and subjected to charging-discharging tests under a constant voltage of 6 V and a constant resistance of 1.2, 5.3, or 8.0 kΩ. The average open circuit voltage of the poly(sodium 4-styrenesulfonate) membrane was found to be 2.7 V.

EXAMPLE 3

Fabrication of a poly(4-styrenesulfonic acid) membrane

Following the procedure described in Example 1, a poly (4-styrenesulfonic acid) membrane, having a thickness of 0.1 mm, was fabricated.

Assembly and Testing of a Graphite/Membrane/Graphite Device

Following the procedures described in Example 1, a device was assembled and subjected to charging-discharging tests under a constant voltage of 6 V and a constant resistance of 1.2, 5.3, or 8.0 kΩ. The average open circuit voltage of the poly(4-styrenesulfonic acid) membrane was found to be 1.3 V.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A polarizable ion-conducting material, the material comprising mobile ions and a matrix formed of a polymer having ionic groups of a charge opposite to that of the mobile ions, wherein the material is a membrane having a thickness of 10 µm to 1 cm and has a polarization of at least 0.2 mC/g, a capacitance of at least 0.1 mF/g, an open-circuit voltage of 1.3 to 5 V, and a polarization retention time of at least 5 seconds.

2. The polarizable ion-conducting material of claim 1, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

3. The polarizable ion-conducting material of claim 2, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

4. The polarizable ion-conducting material of claim 1, wherein the mobile ions are cations and the ionic groups are negatively charged.

5. The polarizable ion-conducting material of claim 4, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

6. The polarizable ion-conducting material of claim 5, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

7. The polarizable ion-conducting material of claim 4, wherein the mobile ions are $H^+$, $Li^+$, $Na^+$, $K^+$, $NH_4^+$, $Ca^{2+}$, $Mg^{2+}$, $Fe^{2+}$, $Fe^{3+}$, $Sn^{2+}$, $Co^{2+}$, $Cu^{2+}$, $Ag^+$, $Au^{2+}$, or a combination thereof; and the polymer is a polymer having sulfonic groups, a polymer having carboxylic groups, a polymer having phosphonic groups, a polymer having enolate groups, a polymer having thiolate groups, a polymer having phenoxide groups, or a combination thereof.

8. The polarizable ion-conducting material of claim 7, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

9. The polarizable ion-conducting material of claim 8, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

10. The polarizable ion-conducting material of claim 1, wherein the mobile ions are anions and the ionic groups are positively charged.

11. The polarizable ion-conducting material of claim 10, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

12. The polarizable ion-conducting material of claim 11, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

13. The polarizable ion-conducting material of claim 10, wherein the mobile ions are $F^-$, $Cl^-$, $Br^-$, $I^-$, $OH^-$, or a combination thereof; and the polymer is poly(allylamine hydrochloride), poly(diallyldimethylammonium chloride), poly(acrylamide-co-diallyldimethylammonium chloride), or a combination thereof.

14. The polarizable ion-conducting material of claim 13, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

15. The polarizable ion-conducting material of claim 14, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

16. The polarizable ion-conducting material of claim 9, wherein the mobile ions are $H^+$, $Li^+$, $Na^+$, or a combination thereof; and the polymer is a poly(4-styrenesulfonate).

17. A device for storing electric charge, the device comprising the polarizable ion-conducting material of claim 1, a first conducting layer, and a second conducting layer, the polarizable ion-conducting material being disposed between the first conducting layer and the second conducting layer, whereby, upon charging, the mobile ions migrate toward the first conducting layer thereby polarizing the polarizable ion-conducting material; and, upon discharging, the mobile ions migrate toward the second conducting layer thereby depolarizing the polarizable ion-conducting material.

18. The device of claim 17, wherein the first conducting layer and the second conducting layer are, independently, made of a graphite sheet, a carbon-based conductive material, copper, iron, steel, aluminum, silver, gold, or platinum.

19. The polarizable ion-conducting material of claim 1, wherein the membrane has a thickness of 50 µm to 5 mm.

20. The polarizable ion-conducting material of claim 19, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

21. The polarizable ion-conducting material of claim 20, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

22. The polarizable ion-conducting material of claim 19, wherein the mobile ions are cations and the ionic groups are negatively charged.

23. The polarizable ion-conducting material of claim 22, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

24. The polarizable ion-conducting material of claim 23, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

25. The polarizable ion-conducting material of claim 19, wherein the mobile ions are anions and the ionic groups are positively charged.

26. The polarizable ion-conducting material of claim 25, wherein the material has a polarization of 2 mC/g to 25 C/g, a capacitance of 1 mF/g to 80 F/g, a polarization retention time of at least 10 seconds, an energy density of 1 W·h/kg to 30 W·h/kg, a power density of 100 W/kg to 5000 W/kg, and an ion conductivity of 0.0001 S/cm to 100 S/cm.

27. The polarizable ion-conducting material of claim 26, wherein the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

28. The polarizable ion-conducting material of claim 22, wherein the mobile ions are $H^+$, $Li^+$, $Na^+$, or a combination thereof; the polymer is a poly(4-styrenesulfonate); and the material has a polarization of 0.1 C/g to 25 C/g, a capacitance of 0.5 F/g to 80 F/g, a polarization retention time of at least 60 seconds, an energy density of 5 W·h/kg to 30 W·h/kg, a power density of 500 W/kg to 5000 W/kg, and an ion conductivity of 0.001 S/cm to 100 S/cm.

* * * * *